| United States Patent [19] | [11] Patent Number: 4,725,891 |
| Manian | [45] Date of Patent: Feb. 16, 1988 |

[54] FILM IMAGE DIGITIZER

[75] Inventor: Bala S. Manian, Saratoga, Calif.

[73] Assignee: Matrix Instruments Inc., Orangeburg, N.Y.

[21] Appl. No.: 7,128

[22] Filed: Jan. 27, 1987

Related U.S. Application Data

[63] Continuation-in-part of Ser. No. 907,666, Sep. 15, 1986.

[51] Int. Cl.$^4$ .......................... H04N 1/06; H04N 1/18
[52] U.S. Cl. ....................................... 358/285; 358/75; 358/289; 358/290; 358/294
[58] Field of Search .................. 358/285, 289, 290, 75, 358/294

[56] References Cited

U.S. PATENT DOCUMENTS

| 1,751,584 | 3/1930 | Hansell | 358/901 |
| 2,691,696 | 10/1954 | Yule | 358/290 |
| 4,004,079 | 1/1977 | Boston | 358/283 |
| 4,024,518 | 5/1977 | Boston | 340/206 |
| 4,236,183 | 11/1980 | Howe | 358/214 |
| 4,255,764 | 3/1981 | Howe | 358/214 |
| 4,314,159 | 2/1982 | Davis | 358/289 |
| 4,366,509 | 12/1982 | Norrell | 358/289 |
| 4,419,691 | 12/1983 | Sing et al. | 358/75 |
| 4,511,907 | 4/1985 | Fukuchi | 358/75 IJ |
| 4,556,901 | 12/1985 | Sakamoto | 358/289 |
| 4,578,688 | 3/1986 | Okuno | 346/157 |
| 4,605,970 | 12/1986 | Hawkins | 358/290 |
| 4,654,526 | 3/1987 | Nakaji | 358/289 |

OTHER PUBLICATIONS

Castleman, Kenneth R., Digital Image Processing, publ. 1979, pp. 23-24.
Kawazu et al., "Application of Gradient-Index Fiber Arrays to Copying Machines", Applied Optics, vol. 19, No. 7, Apr. 1, 1980, pp. 1105-1112.

Primary Examiner—Howard W. Britton
Attorney, Agent, or Firm—Thomas Schneck

[57] ABSTRACT

An apparatus for digitizing an image on a film material using a plurality of movable equally spaced light detectors. Light sources direct light through a sheet of the material disposed on a transparent drum. The light which is transmitted is imaged onto light detectors through apertures in a mask. As the drum rotates, the mask and light detectors move in unison longitudinally at a rate of one pixel width per drum revolution. One embodiment of a scanning module comprises only light detectors and mask, while another embodiment also includes a pair of lens arrays that image the sheet onto the detectors. There are an integral number of pixel widths between adjacent detectors. A plurality of parallel lines on the mask and a scanner fixed relative to the drum sense the relative position between the mask and the drum for providing corrective feedback information to a motor moving the mask and light detectors. Color recording may be provided with a mask having three rows of apertures in which each row transmits a different one of red, green, and blue light. The film image is represented by a mosaic of pixels with each pixel mapping to an element of memory.

24 Claims, 10 Drawing Figures

U.S. Patent  Feb. 16, 1988  Sheet 1 of 3  4,725,891
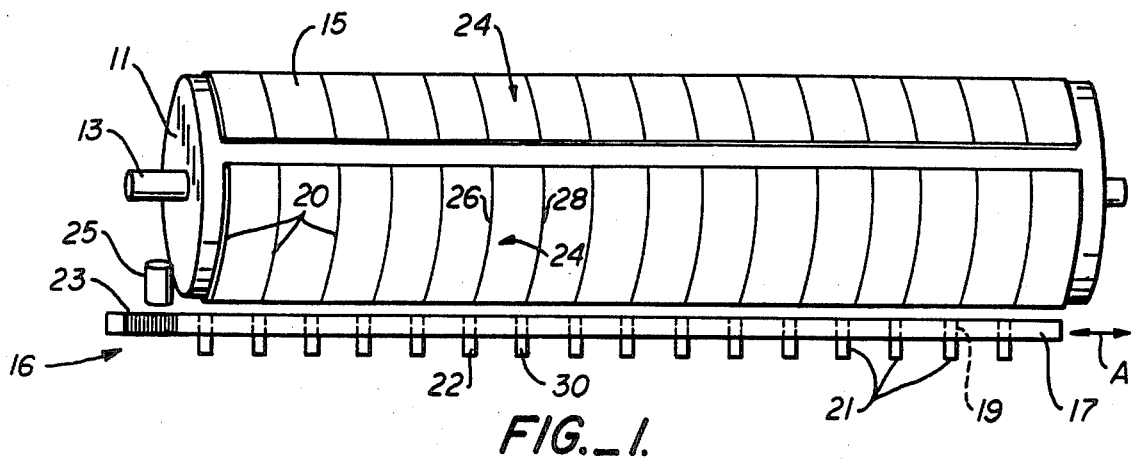
FIG._1.
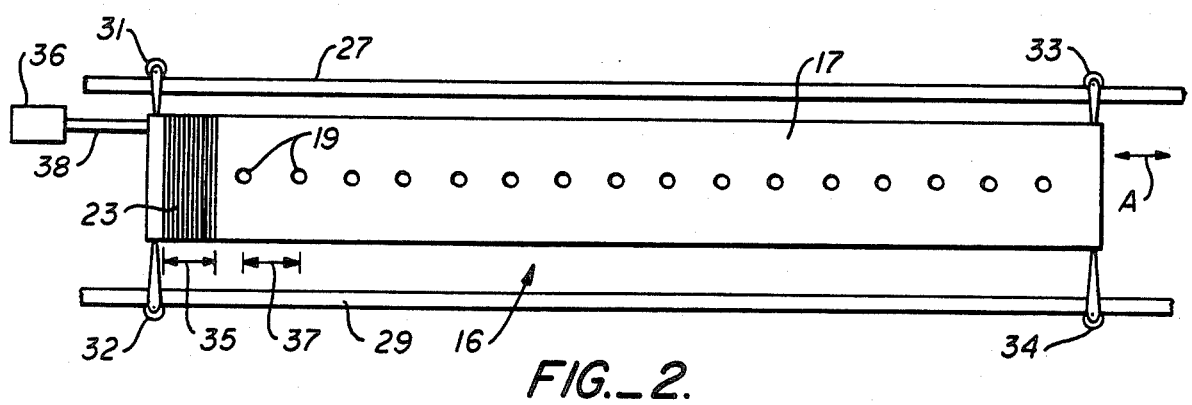
FIG._2.
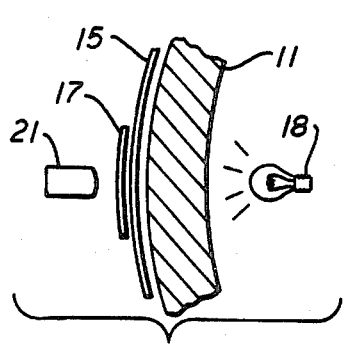
FIG._4.
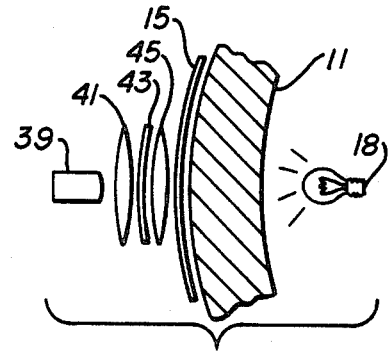
FIG._5.
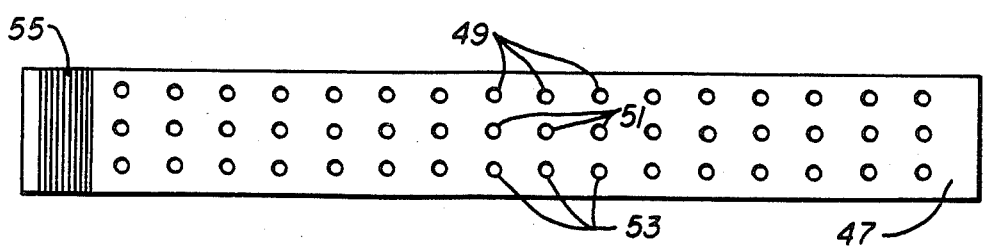
FIG._6.

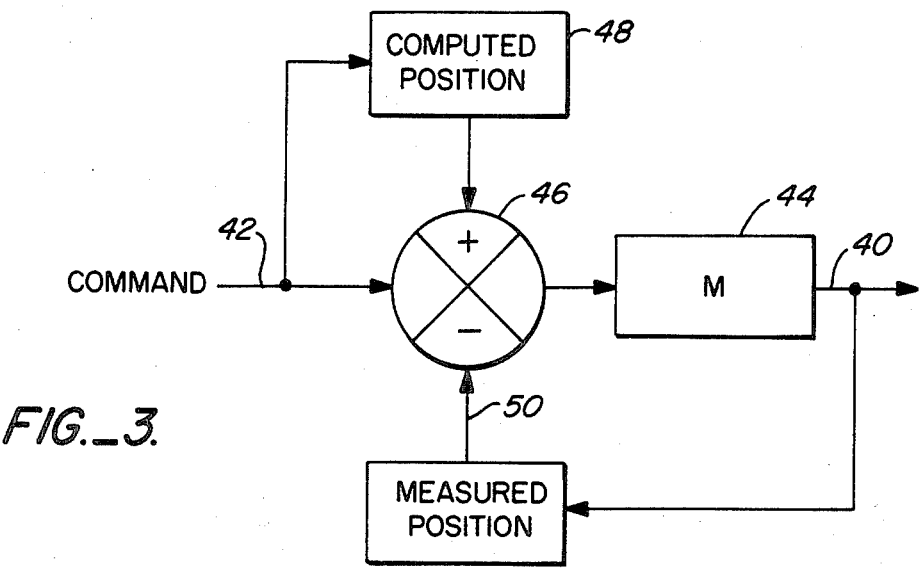
FIG._3.
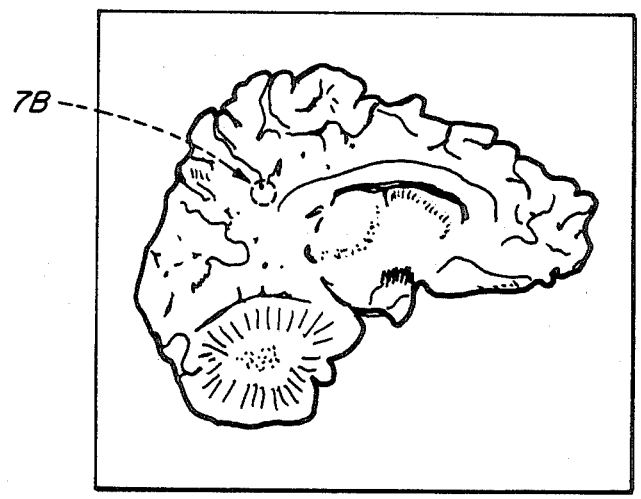
FIG._7A.
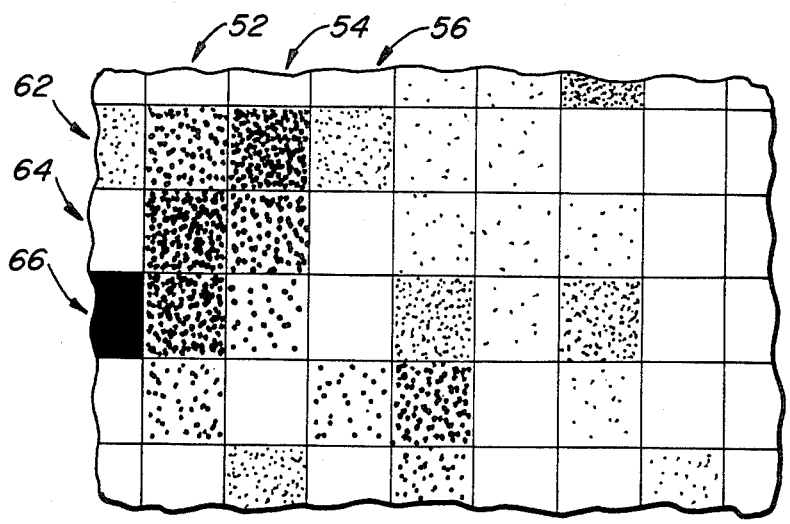
FIG._7B.

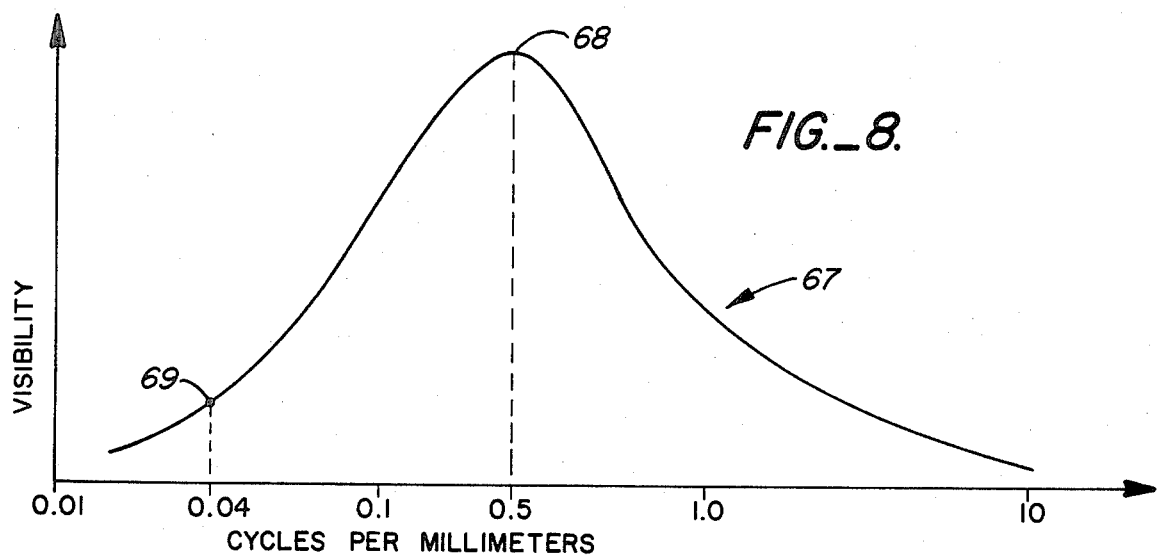
FIG._8.
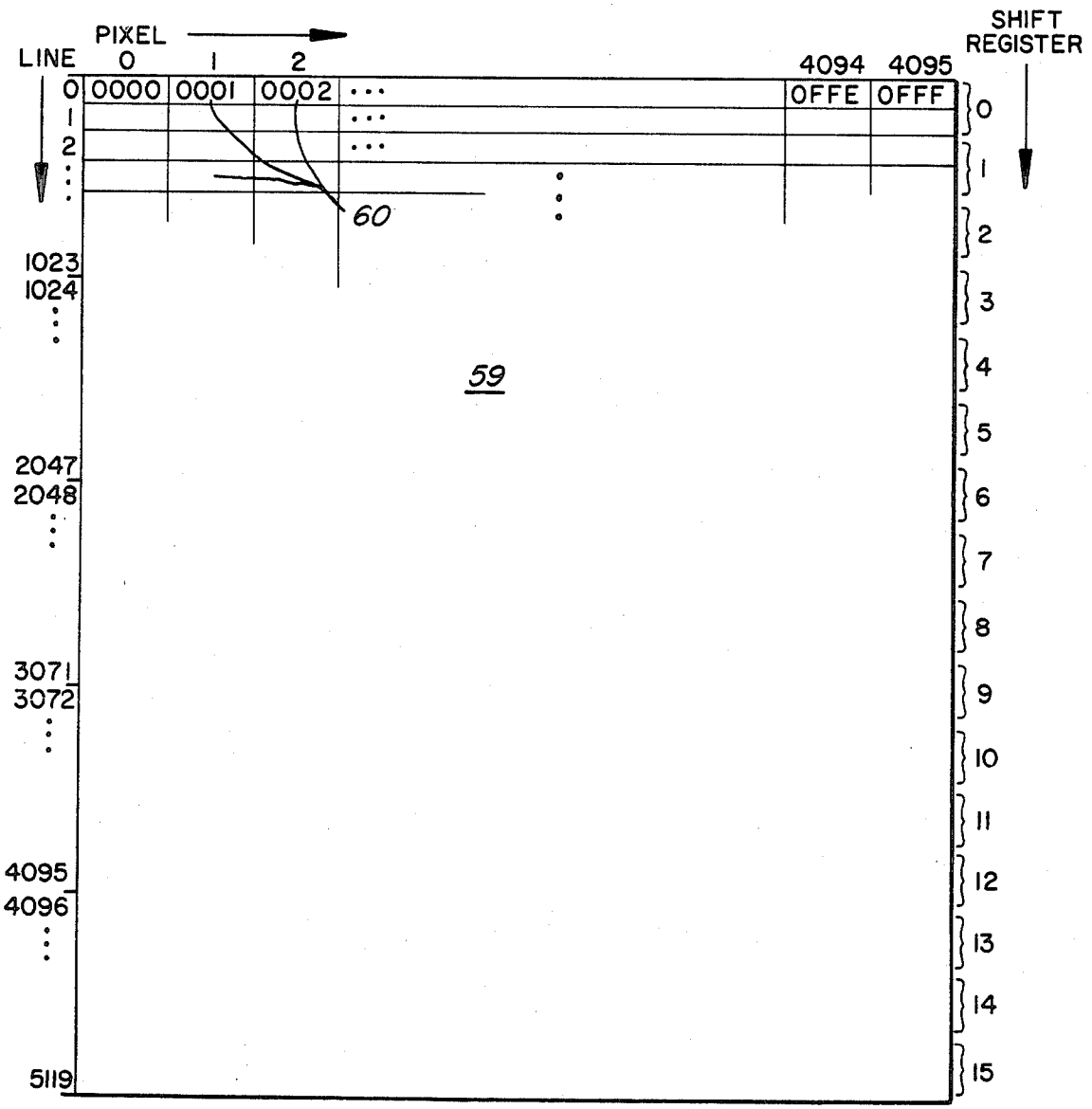
FIG._9.

FILM IMAGE DIGITIZER

CROSS-REFERENCE TO RELATED APPLICATION

This is a continuation in part of patent application Ser. No. 907,666, filed Sept. 15, 1986.

TECHNICAL FIELD

The present invention relates to a method and apparatus for digitizing an image on photographic film and the like and storing the digitized image data in a computer memory device.

BACKGROUND ART

Because of the dramatic drop in cost of computer semiconductor memory, it is becoming economical and efficient to store image data in computer archival storage and use semiconductor memory as a temporary storage site. For example, in a large hospital hundreds of X-ray film images are made every day. In the past these X-ray films were often stored indefinitely. It has been recognized that computer mass storage of such images is preferable if the image can be reproduced with speed and accuracy. For example, such storage might be on optical or magnetic disks. It is also desirable to digitize images on hard film copies produced by CAT scanning and magnetic resonance imaging applications where the original digital image data has been lost or discarded.

In U.S. Pat. No. 4,236,183, Howe discloses an apparatus for scanning film which includes a solid-state line sensing array for scanning a given line of projected image of the film in a direction generally perpendicular to the length of the film, and a rotating multifacet mirror for displacing the image relative to the line sensing array in a direction generally parallel to the length of the film to effect a raster scan of the film. A light source behind the film and a scan lens project the image portion defined by a film gate onto the sensing array. To reduce distortion the optical axis of the scan lens, the axis of rotation of the multifacet mirror and the center of the film gate lie in a common plane with the multifacet mirror located in the optical path between the scan lens and the film.

There are present efforts devoted to devising image digitizers and reproducers which are both faster and simpler without sacrificing the reproduced image quality of prior devices. For example, a compact scanner/plotter is described in U.S. Pat. No. 4,024,518 to Boston. A photosensitive film is mounted on a rotatable drum. A scanning head moves on a precision leadscrew so as to scan the film in a helical fashion as the drum rotates. The medium receives an exposure that is a function of the gray levels of the image being recorded. Unfortunately, presently available leadscrews are not accurate enough to avoid misregistration between adjacent lines recorded on the medium, which typically are less than 100 microns wide. Further, most drum-type film scanners are slow, typically taking about five minutes to record or digitize an image on a 14 inch by 17 inch sheet of film. It would be desirable to scan an image on such a film sheet in about twenty seconds. However, such a recording speed would require a drum speed of about 15,000 rpm, which is not practical.

An object of the present invention is to produce an apparatus for digitizing an image from a film medium which is both compact, accurate and fast without sacrificing image quality.

DISCLOSURE OF THE INVENTION

The above objects have been met with an apparatus in which a film image medium supported on a transparent drum is scanned by a plurality of optical detectors, such as photodiodes, spaced apart at uniform distances along a line. Each detector images localized areas of the medium, representing image pixels of a certain size and measures the amount of light transmitted through the film. One or more light sources, such as light emitting diodes (LEDS), located inside the transparent drum illuminate the medium. As the drum rotates, the detectors move longitudinally, i.e. parallel to the drum axis, along parallel rails by one pixel width per drum revolution, thereby scanning tightly woven helical lines of pixels. The detectors are equally spaced by an integral number of pixel widths so that after that number of drum revolutions, the entire image has been scanned. The detectors produce electrical signals representative of each pixel's light transmittance. The signals are then converted into digital data for storage in semiconductor memory cells for immediate processing or on a mass storage device for long term archival storage.

In one embodiment of the invention, an opaque mask, useful for defining the size and location of the pixels, is positioned over a portion of the drum and has a plurality of equally spaced apertures, through which the transmitted light is directed. The detectors and mask move in unison as the pixels are scanned helically on the medium. A plurality of parallel, circumferentially oriented position encoder lines are fixed relative to the apertures on the mask or fixed relative to the drum, while a reference beam and detector are fixed relative to the other of the mask or drum. These encoder lines are used to measure the relative lateral or axial position between the mask and the drum, and thus between the detectors and the medium on the drum. A servo controller compares expected or commanded position to the actually measured position and generates an error signal representing any deviation between the two. Servo motors in communication with the detector respond to the error signal and correct any position errors thereby preventing misregistration of adjacent lines of pixels.

Lens arrays may be positioned between detectors and the mask and between the mask and the medium. A first lens array images the mask onto the detectors. A second lens array images the medium onto the mask. The apertures on the mask may be either arranged in a single longitudinal line or three parallel longitudinal lines. In a color digitizer embodiment, each of three parallel rows of apertures transmits light of a different color than the other rows of apertures, thereby enabling color scanning of an image. The image is represented by a mosaic of the pixels, each pixel mapping a single memory device location for a monochrome image and three memory locations for a color image. The memory is an array of data byte storage locations, with a one-to-one correspondence between memory device locations and image pixels for a monochrome image.

BRIEF DESCRIPTION OF THE DRAWINGS

FIG. 1 is a perspective view of a drum image digitizer in accord with the present invention.

FIG. 2 is a plan view of a mask-detector module on rails for use in the apparatus of FIG. 1.

FIG. 3 is a schematic of a servo system used in the apparatus of FIG. 2.

FIG. 4 is a schematic side sectional view of the apparatus of FIG. 1 using the module of FIG. 2.

FIG. 5 is a schematic side sectional view of the apparatus of FIG. 1 using a second module embodiment.

FIG. 6 is a plan view of a third construction for a mask-detector module for use in the apparatus of FIG. 1.

FIG. 7a is an image to be digitized in accord with the present invention.

FIG. 7b is a magnified portion of an image pixel mosaic representing the image of FIG. 7a.

FIG. 8 is a graph showing the relative visibility of gray scale differences in reproduced images as a function of the number of band cycles per millimeter.

FIG. 9 is a plan of a semiconductor memory showing the manner in which image data is shifted in from the detectors.

BEST MODE OF CARRYING OUT THE INVENTION

With reference to FIG. 1, a drum-type image digitizer comprises a transparent cylindrical drum 11 which is revolvable about axial supports 13 and which is capable of supporting on its circumferential surface a sheet 15 of film material containing a visible image. Typically, drum 11 is about 18 inches (45 cm) long and about 4.5 inches (11.4 cm) in diameter. The drum is thus capable of holding a sheet 15 as large as 14 inches by 17 inches (35 cm by 43 cm). Drum 11 is made of a transparent material, such as glass or plastic, so as to permit light from one or more sources inside the drum to illuminate the back side of sheet 15. Typically, drum 11 is rotatable at a speed of about 900 rpm. Typically, sheet 15 is an exposed and developed photographic film, such as Kodak Ektascan film. Either transparency (positive image) or print (negative image) film may be used. Normal usage calls for a light tight enclosure or room, not shown, reducing stray light reaching the detectors.

The image digitizer further comprises a detector-mask module 16 located adjacent to sheet 15. Module 16 includes a movable opaque mask 17 with a plurality of equally spaced apertures 19 therein and a plurality of light detectors 21, such as photodiodes, with their light receiving faces directed at the apertures. The apertures are circular and of equal size, serving to define the shape, size and position of the pixels. The apertures 19 are positioned in a line along the length of the drum 11. Typically, the module has 16 apertures and 16 light detectors. One or more light sources located inside transparent drum 11 emit beams, each of which illuminates the back of sheet 15 on the drum. Different shades of gray of the image on sheet 15 transmit different amounts of light. The transmitted light is directed through apertures 19 to detectors 21. Preferably, detectors 21 can distinguish at least 256 discrete intensity levels of transmitted light. Detectors 21 produce analog electrical signals corresponding to the intensity levels which are then converted to digital image data by an analog-to-digital converter and stored in a semiconductor memory. The data may then be processed or transferred to more permanent mass storage devices, such as magnetic hard disks or optical data disks.

Module 16 is movable in a longitudinal direction, parallel to axial supports 13, as indicated by arrows A in FIGS. 1 and 2. Mask 17 and light detectors 21 move in unison together, the entire module riding on two longitudinally oriented parallel rails 27 and 29 adjacent to the drum 11, as shown in FIG. 2. Module 16 is shown movably supported on the rails 27 and 29 by wheels 31, 32, 33, and 34 fixed to the module. A servo motor 36 connected to module 16 via an arm 38 moves the module along the rails. Arm 38 may be a rod, cable, chain, gear or any other means which is known for connecting a motor to an element to be moved.

Position sensing for the detector-mask module 16 is provided by position encoder lines 23 on mask 17 and a scanner 25, seen in FIG. 1, which is fixed relative to the drum. Thus, lines 23 and scanner 25 sense the relative position between the apertures 19 in the mask 17 and the drum 11. Alternatively, the scanner may move with module 16 while the encoder lines 23 are fixed relative to the drum. Encoder lines 23 on mask 17 are preferred because any environmental factors, such as shrinkage of the mask, affect both the separation of apertures 19 and the separation between adjacent encoder lines equally. Scanner 25 comprises a light source, such as a laser, directing a beam at encoder lines 23 and a photodetector for receiving reflected or transmitted light from the encoder lines. Such scanners are well known and are commonly used for reading bar code. Actual position information obtained by scanner 25 is sent to the servo motor for controlling and correcting the position of module 16. Preferably, the position sensing apparatus has a resolution at least as small as a pixel width.

Position encoder lines 23 are parallel and generally directed circumferentially about the drum. Thus as the mask 17 moves longitudinally, scanner 25 encounters each of the lines 23 sequentially. Lines 23 are separated by an equal distance from each other, which is preferably equal to one pixel width. Thus, by tracking one line 23 for each complete drum revolution, accurate registration of adjacent pixel lines is possible. The width 35 of the set of lines 23 is preferably equal to the distance 37 between adjacent apertures 19. There are an integral number, typically about 320, lines 23 within this width 35. Measured position information is compared with either commanded or computed position information and the deviation is an error signal which is used as corrective feedback to the servo motor. Position information may be computed simply by multiplying the nominal rate of advance of the mask by the time over which advance occurs, yielding a distance or position. Mask travel is always from a marked, known home or zero position, so that the computed position is relative to the home position. The measured position is also relative to the home position.

In FIG. 3 a commanded or desired position for the movable mask is entered as an electrical signal along line 42 directed toward motor 44 through summing junction 46. From the command signal 42 a computed position signal is derived by an electrical circuit 48. This circuit may be a simple analogue multiplier computing distance from rate and time information relative to the home position, as previously described. Alternatively, it may be a simple counter circuit counting steps of a motor or a more elaborate circuit for computing position as if the system were an open loop system. The output of the computed position circuit 48 is a positive signal which is balanced by a negative signal from feedback loop 50. As long as no error is detected in measured position, the command signal drives motor 44 without offset by feedback. The output of motor 44 is an electrical signal taken along line 40 which drives lateral or axial motion of opaque mask 17 in FIG. 1 in the direction indicated by arrows A.

Returning to FIG. 3, a position measuring transducer, such as the scanner previously described makes a physical measurement of position and converts the measurement to an electrical signal representing mask position relative to the home location. This electrical signal is taken along line 50 and fed to summing junction 46 where it is compared to the computed position signal. Any difference in these two signals is an error signal which offsets the input command signal 42, providing a correction to the intput signal. This feedback is a servo control on motor 44 since the motor is typically current driven. A proportional increase or decrease in the driving current increases or decreases the output force in a proportional manner thereby adjusting the position of the mask. Another servo, similar to the servo shown in FIG. 3 governs drum rotational speed. Accurate and low-cost rotational servos are commonly used in high fidelity audio recording and playback from turntables and such a servo is adequate for the drum. Drum position is measured by circumferential closely spaced marks at the edge of the drum read by an optical scanner. The measured drum velocity is compared with the desired velocity and appropriate corrections are made by feedback to the drum motor.

With reference to FIG. 4, a sheet 15 of photosensitive material is disposed on a drum 11. A mask 17 covers a portion of sheet 15. A light source 18 directs a beam of light through drum 11 onto sheet 15. Light transmitted through sheet 15 is directed through an aperture in mask 17 onto light detector 21. Typically, the gap between the light detector 21 and mask 17 is between 12 and 20 mils (300 to 500 microns). The gap between mask 17 and sheet 15 is about 20 mils (500 microns). For a mask 17 having apertures with diameters between about 25 and 45 microns, the beam divergence is collimated to about 5 degrees, and the resulting pixels on sheet 15 have a size between 70 and 90 microns on a side. The pixels are preferably circular, but their shape is governed by the shape of the apertures in the mask. Smaller apertures may be used to produce pixels having a size as small as 15 microns.

With reference to FIG. 5, a mask 43 again covers a portion of sheet 15 on drum 11. A light source 18 directs light through drum 11 onto sheet 15. Transmitted light is directed through an aperture in mask 43 onto a light detector 39. In this embodiment, a pair of lens arrays 41 and 45 are also present. A first lens array 41 is positioned between light detector 39 and mask 43. Second lens array 45 is positioned between mask 43 and sheet 15. Lens arrays and their application are described in the article: Motoaki Kawazu and Yukio Ogura, "Application of Gradient-Index Fiber Arrays to Copying Machines," *Applied Optics*, vol. 19, no. 7, Apr. 1, 1980, pp. 1105–1112. In the present application, lens array 45 images the sheet 15 onto mask 43. Lens array 41 images the mask onto the photodetectors 39. Light detectors 39 thus receive light from those places of sheet 15 where the image of the illuminated apertures on the mask appears. The embodiment in FIG. 4, enables the gap between the mask and the sheet to be widened from only 20 mils (500 microns) to the image distance of lens array 45, typically on the order of several millimeters.

With reference to FIG. 6, a mask 47 that enables color images to be digitized has three rows 49, 51 and 53 of apertures. In each of the rows 49, 51 and 53, apertures are arranged in a line and spaced apart equally by an integral number of pixel widths. Typically, mask 47 has 48 apertures, 16 apertures per row, spaced about one and one-sixteenth inches apart. Rows 49, 51 and 53 are also spaced apart from each other by an integral number of pixel widths. A plurality of parallel equally spaced position encoder lines 55 are also provided on mask 47, and perform the same function as lines 23 in FIG. 2.

As in FIG. 2, light detectors receive light transmitted through an image containing sheet through the rows 49, 51 and 53 of apertures. In the present embodiment, red light is transmitted through apertures in first row 49, green light is transmitted through apertures in second row 51, and blue light is transmitted through apertures in third row 53. The particular order of colors for first, second and third rows of apertures is not essential. Red, green and blue LEDs or semiconductor lasers may be used as light sources. Alternatively, white light sources may be used in combination with red, green and blue filters over the respective rows of apertures or light detectors sensitive to red, green and blue wavelengths.

The light detectors are responsive to image pixels on the sheet to produce data signals that correspond to the variable intensity. Since apertures in mask 47 are located in three separate rows 49, 51 and 53, data for each color of a particular pixel is received by three different semiconductor memory spaces after an appropriate time delay, since the three light detectors for the same pixel receive light from the same spot on the sheet at different times.

Referring again to the apparatus in FIGS. 1 and 2, as drum 11 rotates, module 16 moves longitudinally at a rate of one pixel width per drum revolution. Each light detector 21 scans sheet 15 in a sequence of adjacent lines 20 of pixels until the entire sheet is scanned. Since a plurality of light detectors are used, each detector need only be responsible for a single band of the image rather than the entire image. Thus, for example, detector 22 is responsible for scanning a band 24 of the image beginning with lines 26 produced by detector 22 and extending to lines 28 produced by the adjacent detector 30. The number of light detectors which may be used is subject to several practical constraints. The single detector apparatus of the prior art typically takes over five minutes to digitize an entire image. Even a four-detector apparatus requires nearly one and one-half minutes to digitize an image. Doubling the number of light detectors, every other factor remaining the same, generally reduces the scanning time required by half.

Cost and space limitations provide an upper bound to the number of light detectors which may be used. For example, typical photodiode detectors have a width of about 0.2 inch. For an apparatus using those light detectors in close proximity to the mask and digitizing 17 inch wide sheets, a maximum of about 85 may be used. Light detectors having smaller dimensions are continually being developed, and as these become available, they may also be used. The light detectors may also be positioned remote from the rest of module 16 and be connected to the module via optically transmissive fibers. The detectors must respond and the analog signals be converted by an A to D converter at a sufficiently fast rate, or drum rotation must be sufficiently slow, so that each pixel or spot in a band can be different. A typical drum rotation rate is 900 revolutions per minute. At this rotation rate, with a 15 inch circumference drum, the detector response rate is 75 KHz. An entire image, as shown in FIG. 7a, is then a pixel mosaic wherein each pixel represents a corresponding byte to be stored in memory. The one-to-one correspondence between pixels and bytes in a monochrome image brings about the requirement for a large semiconductor image cache.

The one-to-one correspondence may be seen in FIG. 7b showing an enlargement as seen over time by a photodetector of a portion of the film of FIG. 7a indicated by the dashed circle wherein each column 52, 54, 56 represents a scanning trace of a detector. The magnification is roughly twenty times. Within each column is a plurality of pixels, such as pixels 62, 64, 66. Each pixel represents a byte of digital data, but expressed in terms of a gray scale level, indicated in FIG. 7b by dot density. An entire image is digitized in this manner, with several detectors operating simultaneously, each imaging pixels within a column until the space between columns has been completely scanned by migration of the mask a short distance across the drum. That distance corresponds to the spacing between apertures in the mask.

When the digitized image is later reproduced, pixels have a sufficiently small size such that they are barely resolvable by the human eye, or not resolvable at all, without magnification. The human eye ignores boundaries between pixels when the gray scale contrast level is close. However, when the gray scale contrast level approaches maximum, lines may be seen in the reproduced image, just as in regular photographic film. In common photographic film, grains of silver-halide emulsion might be 100 to 1000 times smaller than the image pixels of the present invention. If pixels are considered as tiles whose gray scale is measured by the detectors, the digitized image of the present invention is then an array of measurements corresponding to a mosaic pattern of such tiles.

FIG. 8 illustrates a third constraint to the number of permissible light detectors. In practice, no two light detectors are identical. Consequently, a band of the image scanned on the sheet by one light detector may have a slight, but sometimes noticeable, difference in gray scale measurement from an adjacent band scanned by a different light detector. When the image is reproduced if the image bands are narrow or wide enough, the human eye may not notice the difference in gray scale between adjacent bands. The curve 67, in FIG. 6, shows the relative visibility of a gray scale difference as a function of the number of cycles or bands per millimeter. At 0.01 cyles per millimeter, i.e., 10 centimeter wide bands, visibility is low. Similarly, at 10 cycles per millimeter, i.e., 100 micron wide bands, visibility is low. Visibility is at a maximum at point 68 on the curve, i.e., at 0.5 cycles per millimeter, corresponding to 2 millimeter wide bands.

For a 17 inch wide film sheet, 0.01 cycles per millimeter corresponds to approximately 4 light detectors. As discussed above, this number of detectors produces an apparatus which is slow. Ten cycles per millimeter corresponds to approximately 4,000 light detectors. As discussed above, this number of detectors requires more space than is available using presently available sources. Maximum visibility corresponds to about 200 light sources. Generally, any number of light detectors from about 50 to about 1000 measures bands on 17 inch wide sheets which when reproduced are too visible to be desirable. Thus, 16 detector apparatus are preferred. This corresponds to about 0.04 cycles per millimeter, i.e., point 69 on curve 67. Apparatus using 8 and 32 light detectors are also acceptable. Alternatively, the differences in detectors can be minimized by appropriate processing of the image data.

With reference to FIG. 9, a semiconductor memory 59, typically associated with a computer, stores data representing the image. The storage device, such as a random access memory array stores one byte representing a gray scale contrast level for a pixel. There is one memory storage location for each pixel in the image so that there is a one-to-one mapping of memory storage locations to pixels. An image to be digitized from a 14 inch by 17 inch sheet as an array of 85 micron size pixels requires about 20 million pixels and so a 20 megabyte semiconductor memory. Each 14 inch line of pixels requires 4,096 pixels. Typically, each pixel may be distinguishable as any of about 256 shades of gray, thus requiring eight bits to represent the gray scale of a pixel. Alternatively, twelve bits may be used to store up to 4,096 shades of gray. Therefore, semiconductor memory 59 requires twenty megabytes of storage for an image. Such a memory is the image cache previously mentioned. Color images require three image caches, one for each of the three primary colors, red, green and blue, used in FIG. 5. Twenty megabytes of semiconductor memory for an image cache may be formed, for example, from eighty 256 K dynamic RAM chips. The three memories are mapped from a single color image film sheet by light detectors receiving light of the primary colors.

Memory 59 is a memory array of storage cells 60. Each of the storage cells contains a byte of image data representing a pixel of an image. Memory 59 is organized into successive lines of storage cells 60 representing successive lines of the image. In FIG. 9, lines of storage cells are numbered from 0 to 5119 on the left hand side of the figure. Typically, each line has about 4096 storage cells corresponding to pixels, numbered from 0 to 4095 at the top of FIG. 9. Memory 59 is further organized into groups of successive lines, corresponding to the sixteen shift registers numbered 0 to 15 on the right hand side of FIG. 9, and also representing bands of pixels in the image.

The number of light detectors determines when lines of data are shifted into memory 59. Each detector is provided with an A to D converter and a shift register tied to a group of data lines. For a sixteen detector apparatus, sixteen shift registers are provided, numbered zero through fifteen in FIG. 9, for sixteen groups of lines. Each group typically has about 320 lines. For example, shift register zero is tied to data lines 0 to 319, shift register one is tied to data lines 320 to 639, and so forth. Sixteen lines of data, one from each group, are simultaneously entered byte by byte via the sixteen shift registers from each of the sixteen light detectors. Each light detector receives light with an intensity which varies according to the gray scale of the image pixels. The light detector produces an analog electrical signal corresponding to the gray scale which is then converted to a corresponding digital electrical signal. The digital signal is converted into corresponding eight bit gray scale bytes and shifted byte by byte into memory. After each shift register has entered a complete line, the next successive group of lines is shifted into memory, until the entire digitized image has been entered.

Typically, a fourteen inch circumference drum rotates at a speed of about 900 rpm. Data must then be entered at a rate of 67 milliseconds per line or 16 microseconds per byte. Speed at which data can be entered into semiconductor memory is therefore generally not a factor, since write cycles on the order of 100 nanoseconds per byte are now common. Once a sheet has been completely digitized and stored in semiconductor memory it may be processed using known digital image processing techniques or it may be transferred to more permanent archival storage on magnetic or optical storage media in tape, disk or drum formats.

The invention described above may be used to store hard copy images of computer stored X-ray, magnetic resonance and tomography images as well as ordinary photographic images. Images can be color separated, enhanced or otherwise manipulated by computer prior to reproducing the image on plates or film. This apparatus is both compact and fast, yet it does not sacrifice any of the image quality of the best prior art devices.

I claim:

1. An apparatus for digitizing an image contained on a sheet comprising,
   a transparent drum revolvable about a longitudinal axis and capable of supporting a sheet containing an image about the drum,
   at least one light source inside said drum emitting light onto the back of said sheet,
   a plurality of spaced apart light detectors receiving light of variable intensity transmitted through said sheet, said detected light representing pixels of a characteristic width on said sheet, said detectors being equally spaced apart relative to said sheet by an integral number of pixel widths, said detectors being responsive to said light to produce bytes of digital image data,
   means for moving said light detectors longitudinally parallel to the drum axis an integral number of pixel widths per drum revolution, and
   a memory device having a number of storage locations, said memory device in electrical communication with said detectors for storing said bytes of digital image data in said storage locations.

2. The apparatus of claim 1 wherein said variable intensity light is distinguished by said detectors in a plurality of discrete intensities.

3. The apparatus of claim 1 wherein said memory device has storage locations equal in number to the pixels defined on the sheet.

4. The apparatus of claim 1 further comprising servo means for adjusting the longitudinal position of said light detectors.

5. The apparatus of claim 4 wherein said servo means comprises position measuring means for detecting the relative position between said detectors and said drum, including a plurality of parallel circumferential position encoder lines fixed relative to either said detectors or said drum, the separation between adjacent lines being equal to said pixel width, and means fixed relative to the other of said detectors or said drum for reading said position encoder lines.

6. The apparatus of claim 1 further comprising an opaque mask positioned over at least a portion of said drum and having a plurality of equally spaced apertures therein, said detectors being directed toward said sheet through said apertures.

7. The apparatus of claim 6 further comprising a pair of lens arrays, a first of said arrays positioned between said light detectors and said mask, a second of said arrays positioned between said mask and said medium, said first lens array imaging said mask onto said detectors, said second lens array imaging said sheet onto said mask.

8. The apparatus of claim 6 wherein said apertures are arrayed in a single line parallel to said longitudinal axis.

9. The apparatus of claim 6 wherein said apertures are arranged in three rows parallel to said longitudinal axis, each of said rows of apertures transmitting light beams having a different color than adjacent rows of apertures.

10. An apparatus for digitizing an image on a film medium comprising,
    a transparent cylindrical drum revolvable about a longitudinal axis and capable of supporting a sheet of film image material about said drum,
    at least one light source in said drum for illuminating the back of said sheet,
    an opaque mask positioned over at least a portion of said drum and slightly spaced apart therefrom, said mask having a plurality of apertures thereon,
    a plurality of light detectors receiving light of variable intensity transmitted through said sheet, said light being directed from said sheet through said apertures onto said detectors, said detectors responsive to said received light to produce bytes of digital image data, there being a one-to-one correspondence between a byte of image data and a pixel on the sheet,
    means for moving said mask and said light detectors in unison, while the drum is revolving, said light detectors imaging pixels on the sheet of film material having a single pixel width, said mask and detectors moving longitudinally one pixel width per drum revolution, there being an integral number of pixel widths between adjacent detectors, the aggregate of all pixels forming a mosaic image, and
    a memory device having a number of storage locations in electrical communication with said detectors for storing said bytes of digital image data.

11. The apparatus of claim 10 further comprising a pair of lens arrays, a first of said arrays positioned between said light detectors and said mask, the second of said arrays positioned between said mask and said sheet on said drum, said first lens array imaging said sheet onto said mask, said second lens array imaging said mask onto said detectors.

12. The apparatus of claim 10 wherein said apertures are arranged in a single row parallel to said longitudinal axis.

13. The apparatus of claim 10 wherein said apertures are arranged in three rows parallel to said longitudinal axis, each of said rows of apertures transmitting light beams having a different color than adjacent rows of apertures.

14. The apparatus of claim 10 wherein said light detectors are photodiodes.

15. The apparatus of claim 10 wherein said at least one light source is a light emitting diode.

16. The apparatus of claim 10 wherein said variable intensity is distinguishable by said light detectors into a plurality of discrete intensities.

17. The apparatus of claim 10 further defined by a memory device having a number of storage locations equal in number to the pixels produced on the sheet.

18. The apparatus of claim 10 further comprising servo means for adjusting the longitudinal position of said light beams.

19. The apparatus of claim 18 wherein said servo means comprises
    (a) means for measuring the relative position between said detectors and said drum, the position sensing means having a resolution at least as small as said pixel width, (b) means for commanding said detectors to a desired position, (c) means for comparing the desired position to the sensed position and deriving an error signal, and (d) means for applying corrective feedback through said servo means.

20. The apparatus of claim 19 wherein said position measuring means comprises, a plurality of parallel circumferential position encoder lines on one of said mask and said drum, the separation between adjacent lines being equal to said pixel width, and means on the other of said mask and said drum for reading said position encoder lines.

21. A method for digitizing an image on a film medium comprising, (a) placing a sheet of film image medium around the surface of a drum, said drum being transparent and having at least one light source within, (b) positioning a mask over a portion of said sheet on said drum, said mask having plurality of apertures thereon, an aperture at one end of said mask being positioned initially at an edge of said film, (c) rotating said drum about a longitudinal axis of said drum, while illuminating the back of said sheet with said light source, (d) detecting with a plurality of light detectors light transmitted through said sheet and through said apertures of said mask, said light having a variable intensity, the light detectors imaging pixels on said sheet having a width, (e) moving said mask and said light detectors in unison longitudinally at a rate of one pixel width per drum revolution, the apertures in said mask being equally spaced at a distance equal to an integral number of pixel widths, and (f) converting said detected variable intensity light to bytes of image data and storing said bytes in storage cells of a memory array, said bytes of image data representing an image on said sheet, each storage cell of the array containing a byte representing a pixel of a monochrome image.

22. The method of claim 21 further defined by:

(a) measuring the relative position errors between said light detectors and said drum with a resolution at least as small as said pixel width, (b) correcting any position errors sensed so as to prevent adjacent pixels from overlapping.

23. The method of claim 21 further defined by arranging said apertures in three rows parallel to said longitudinal axis, with light being directed through said apertures, in step (d) being of three different colors, each row of aperture transmitting a different color of light beam from the other said rows.

24. The method of claim 21 wherein sensing the position comprises reading a plurality of parallel circumferential encoder lines on one of said mask and said drum, the separation between adjacent lines being equal to said pixel width, a new line being encountered each drum revolution.

* * * * *